United States Patent
Rust et al.

[11] Patent Number: 6,098,190
[45] Date of Patent: Aug. 1, 2000

[54] METHOD AND APPARATUS FOR USE OF A HOST ADDRESS TO VALIDATE ACCESSED DATA

[75] Inventors: Robert A. Rust; Michael B. Jacobson, both of Boise; Christine Grund, Meridian, all of Id.

[73] Assignee: Hewlett-Packard Co., Palo Alto, Calif.

[21] Appl. No.: 09/129,031

[22] Filed: Aug. 4, 1998

[51] Int. Cl.[7] .................................................. G11C 29/00
[52] U.S. Cl. ........................ 714/763; 714/53; 714/719; 714/805; 714/819; 711/114
[58] Field of Search .................. 714/763, 6, 7, 714/48, 52, 53, 702, 718, 719, 766, 805, 819, 4, 114

[56] References Cited

U.S. PATENT DOCUMENTS

| | | | |
|---|---|---|---|
| 4,637,024 | 1/1987 | Dixon et al. | 714/819 |
| 5,301,297 | 4/1994 | Menon et al. | 711/114 |
| 5,469,453 | 11/1995 | Glider et al. | 714/6 |
| 5,504,858 | 4/1996 | Ellis et al. | 714/6 |
| 5,774,643 | 6/1998 | Lubbers et al. | 714/20 |

*Primary Examiner*—Emmanuel L. Moise

[57] ABSTRACT

A memory system constructed in accordance with the invention receives data blocks and associated host LBAs from a host processor. The memory subsystem initially associates a check value with each received data block, each check value dependent upon a host LBA that is associated with the respectively received data block. The memory subsystem stores each received data block and associated check value as an "extended" data block. Thereafter, the memory subsystem, in response to a host processor request to access data corresponding to the associated host LBA, recovers the stored extended data block and determines from the check value stored therewith, if the address of the corresponding data and that provided by the host processor correspond. If the addresses correspond, the data block is transmitted to the host processor. If not, an error message is generated.

14 Claims, 3 Drawing Sheets

METHOD AND APPARATUS FOR USE OF A HOST ADDRESS TO VALIDATE ACCESSED DATA

FIELD OF THE INVENTION

This invention relates to data storage subsystems and methods for control thereof to assure that addressed data is the data which is actually returned in response to an address received from a host processor and, more particularly, to a method and apparatus for use of a received host logical block address (LBA) to assure that returned data directly corresponds to the host LBA.

BACKGROUND OF THE INVENTION

Present-day mass storage subsystems incorporate many small, inexpensive disk drives in various configurations and enable high levels of recoverability in the event of failure of one or more of the disk drives. Such disk drive systems are referred to as RAID systems and provide redundant and inexpensive mass storage facilities. In such RAID systems, disk and sector addresses are often completely unrelated to a logical address which accompanies data from a host processor.

If, for any reason, the storage subsystem contains an error, in either the hardware, firmware or controlling software, the memory subsystem may return incorrect data to the host processor from a non-addressed disk sector—rather than data from the requested sector. For example, if a disk drive controller contains design defects, such defects may result in addressing miscalculations. As there are many address calculations in the path of an input/output operation, any one such miscalculation can cause an incorrect location to be accessed and data therefrom to be provided back to the host processor.

As such design-produced errors are difficult to detect, in advance, it is important to provide the memory subsystem with a method and apparatus for confirming that an accessed memory region, in fact, corresponds to a received host LBA. Such confirmation should preferably be had without requiring substantial added equipment and, further, without consuming substantial added disk space.

Accordingly, it is an object of this invention to provide an improved method and apparatus for enabling a memory subsystem to confirm that data accessed in accordance with a host LBA, in fact, corresponds to the requested host LBA.

It is another object of this invention to provide an improved method and apparatus for enabling a memory subsystem to make use of the host LBA to assure that correct data has, in fact, been provided in response to a host access request.

SUMMARY OF THE INVENTION

A memory system constructed in accordance with the invention receives data blocks and associated host LBAs from a host processor. The memory subsystem initially associates a check value with each received data block, each check value dependent upon a host LBA that is associated with the respectively received data block. The memory subsystem stores each received data block and associated check value as an "extended" data block. Thereafter, the memory subsystem, in response to a host processor request to access data corresponding to the associated host LBA, recovers the stored extended data block and determines from the check value stored therewith, if the address of the corresponding data and that provided by the host processor correspond. If the addresses correspond, the data block is transmitted to the host processor. If not, an error message is generated.

DETAILED DESCRIPTION OF THE INVENTION

Figure 1:
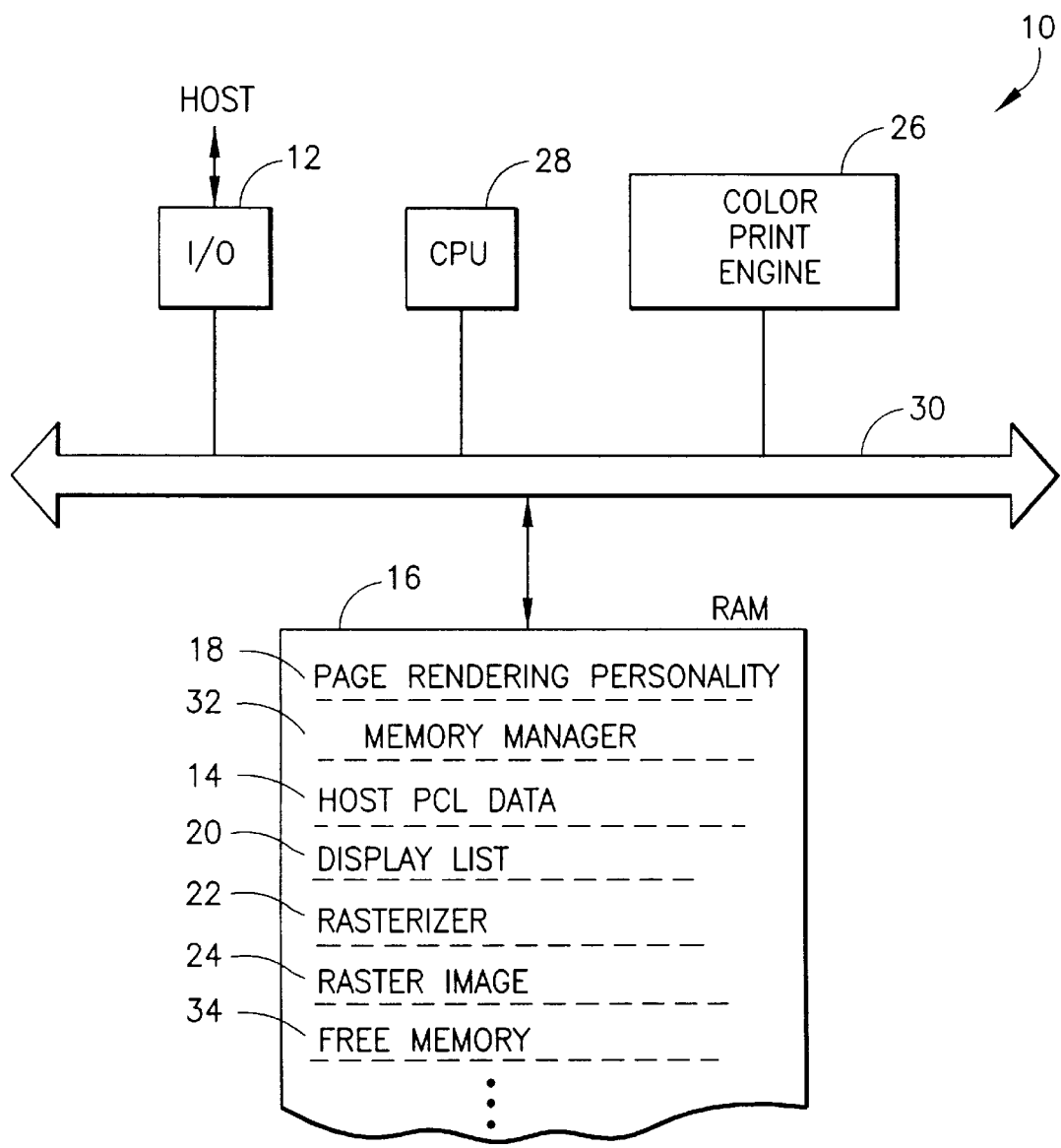
FIG. 1 is a high level block diagram illustrating a memory subsystem that is operated in accordance with the invention.

Referring to FIG. 1, memory subsystem 10 provides a mass storage facility for host processor 12. Commands, and data are received from host processor 12 via front end input/output (I/O) processor 14 and are temporarily stored in input buffer section 16 of memory 18. For purposes of description of the invention, it will be assumed that host processor 12 configures its data in 512 byte blocks. The address for the input data received from host processor 12 is re-mapped such that the input data is stored in a proper location in input buffer section 16. It is to be hereafter understood, however, that the 512 byte block size is chosen only for exemplary purposes and the invention is not dependent upon any particular block size.

Data is stored into memory 18 under control of memory controller 20 which is, in turn, controlled by subsystem controller 22. Subsequent to being stored in input buffer section 16 of memory 18, the received 512 byte blocks from host processor 12 have appended thereto a check value that is calculated in memory controller 20 pursuant to a data validation module 24 contained in memory controller 20. A check value is appended to each host data block to create an "extended" block and each extended data block is then stored onto one or more disk drives 28, via a back end I/O processor 30.

As indicated, when the check value is calculated, it is appended to the host data block to create an extended data block and the extended data block is written onto disk drives 28. It will be hereafter explained, in further detail, that the received host LBA is utilized to calculate the check value.

During a read action, in response to a read request from host processor 12, subsystem controller 22 causes back end I/O processor 30 to read the requested extended data block from a disk drive 28, which extended data block is then buffered in output buffer section 34 of memory 18. When the check value is thereafter recovered from the extended data block, a concurrence is determined between the data, the check value and the host LBA (as provided from host processor 12). Assuming a concurrence, it is confirmed that the requested data is that which corresponds to the host LBA. At such time, the data stored in output buffer section 34 is transmitted, via front end I/O processor 14 back to host processor 12.

If it is assumed that the check value comprises 4 bytes, the addition of such value to a 512 byte data block received from host processor 12 results in 516 byte extended block sizes being stored onto disk drives 28.

As will be hereafter understood, the check value (e.g. a checksum) is utilized to enable a correspondence to be determined between the data recovered from disk and the received host LBA. Such a checksum is created by utilizing the received host LBA as the seed value and then adding to that seed value the sum of the bytes contained in the host data block. Accordingly, when the checksum is retrieved from accessed bytes of an extended data block, assuming that the correct data has been accessed, the remainder at the end of a checksum operation should be the same host LBA as that which was received from host processor 12.

Hereafter, further details of the operation of memory subsystem 10 will be described during both write and read actions. As above indicated, it is assumed that a 4 byte check value is calculated based on a 512 byte block size of data and on the host LBA. Both the data block and check value are stored to disk and the LBA is preferably also stored to disk as part of the extended data block (but that is not a requirement of the invention). Both input buffer section 14 and output buffer section 16 are organized such that each 512 byte sector is interleaved with its check value.

First, host processor 12 requests a write action and supplies command information regarding the data block to be written, such information including the host LBA for the data block. Subsystem controller 22 then writes the received host LBA to an LBA table 25 in memory 18. Front-end I/O processor 14 writes the received data block to the extended data block in memory 18. At the same time, data validation module 24 is invoked by memory controller 20; calculates a check value using the current value of the host LBA; and writes the check value to the extended data block in memory 18. Thereafter, back end I/O processor 30 accesses the extended data block from memory 18 (input buffer 16—in 516 byte block sizes), and causes it to be stored to disk drives 28.

To commence a read action, host processor 12 dispatches a read command which contains the host LBA. Back end I/O processor 30 reads an extended data block from disk drive 28 and writes the extended data block to output buffer section 34 of memory 18 (as 516 byte data). Next, memory controller 20, under control of data validation module 24, reads the host LBA from LBA table 25 in memory 18. Front end processor 14 reads the 512 byte blocks as if the data were aligned on 512 byte boundaries. Memory controller 20 re-maps the addresses in front end processor 14 to the proper 516 byte aligned locations. The data portion of the extended data block is transferred during this action, while memory controller 20 calculates the check value for the data. This allows data validation module 24 to recover the seed host LBA. The recovered seed host LBA is then compared to the host LBA that was also appended as part of the extended data block to determine a concurrence therebetween.

Assuming such concurrence, memory controller 20 enables dispatch of the data block (512 byte aligned) from output buffer section 34 of memory 18, under control of front end I/O processor 14, to host processor 12. If there is no concurrence in the host LBAs, an error message is generated. Note, in lieu of calculating the host LBA from the check value, the host LBA received with the read command from host processor 12 can be used to calculate a new check value, which new check value is then compared with the check value in the extended data block to determine concurrence therebetween.

Figure 2:
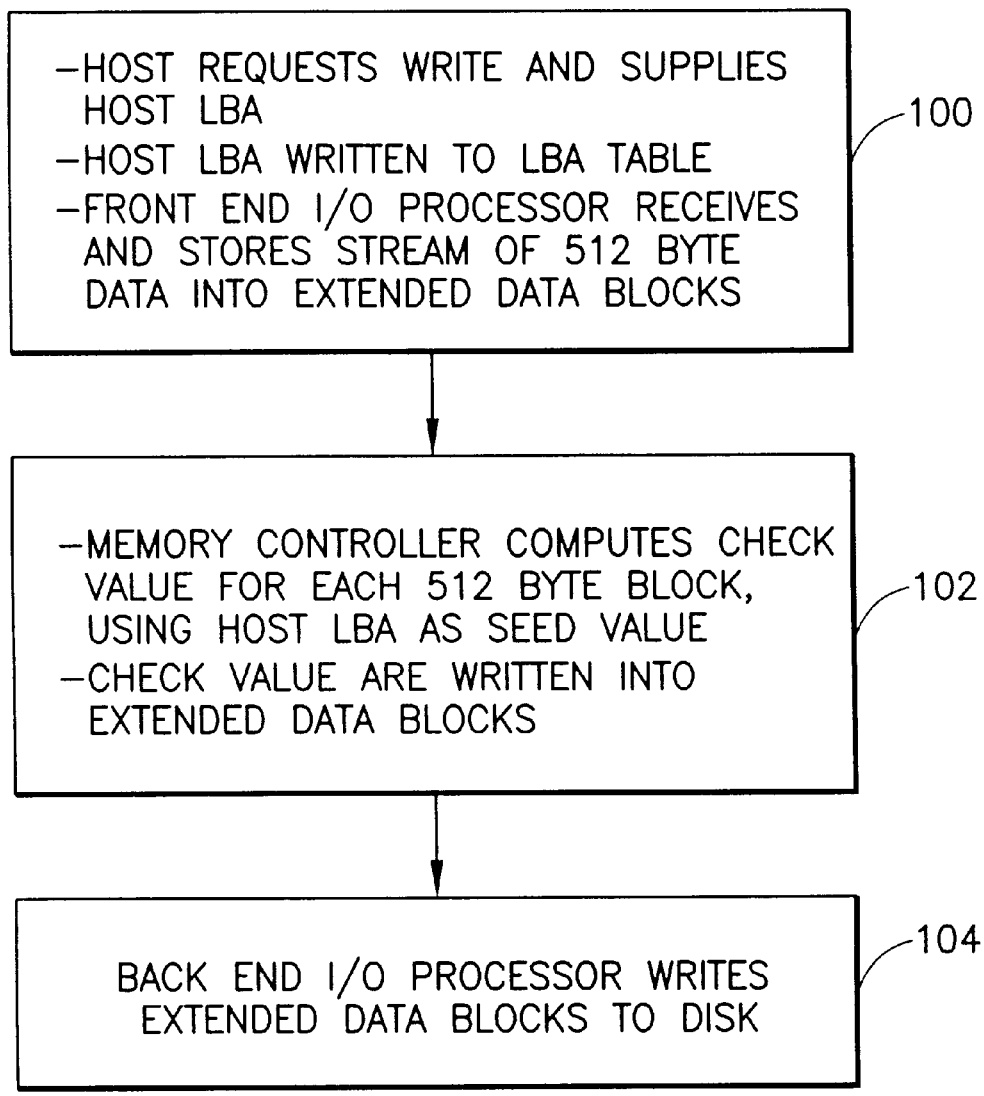
FIG. 2 is a schematic block diagram of logic flow during a host processor write action.
Figure 3:
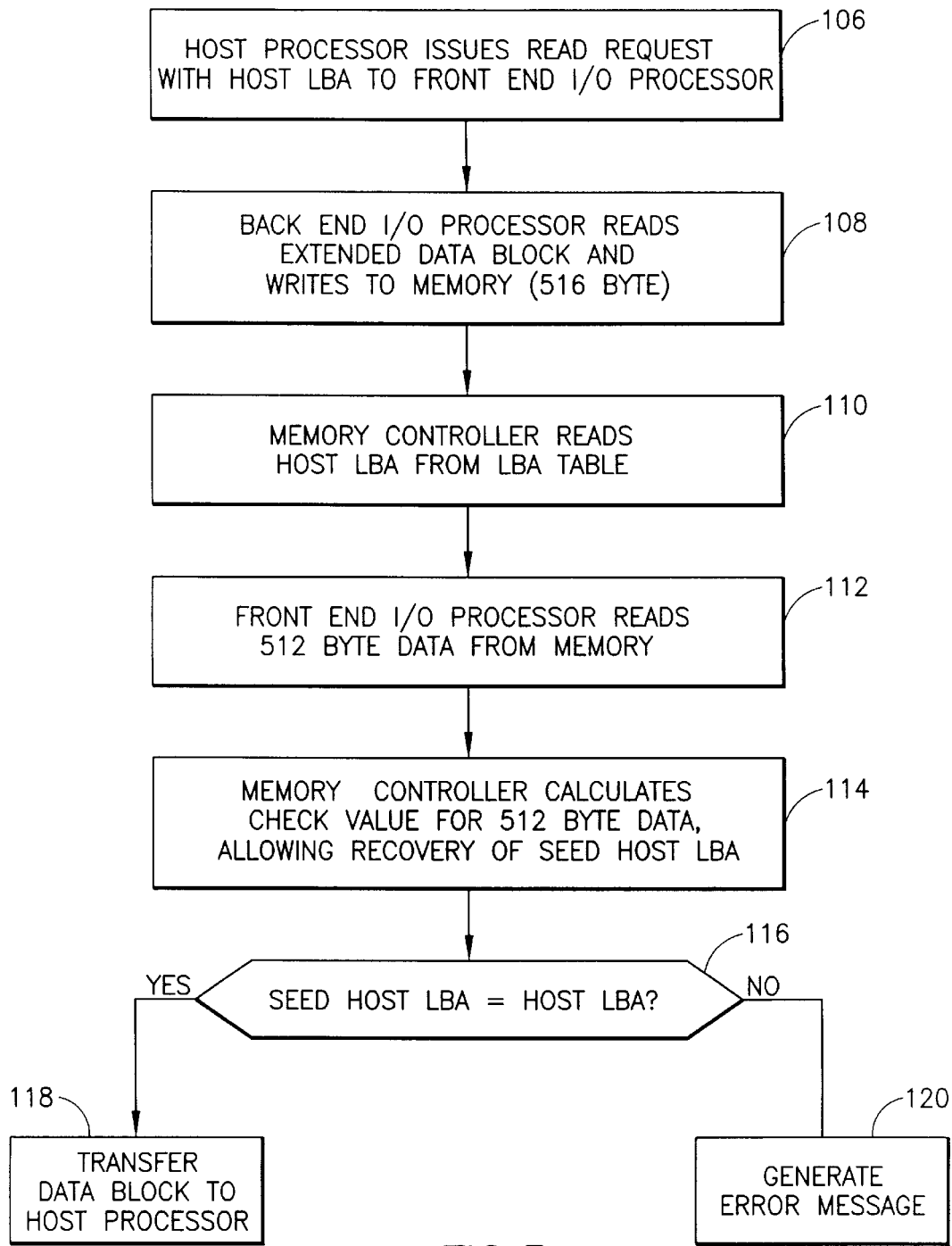
FIG. 3 is a schematic block diagram of logic flow during a host processor read action.

Turning now to FIGS. 2 and 3, the method of the invention will be described in conjunction with the logical flow diagrams shown therein. Initially, as indicated above, front end I/O processor 14 receives a command from host processor 12. The LBA contained in the command is stored in LBA table 25. Next, subsystem controller 22 commands host processor 12 to begin the write of the data. Then, the data stream from host processor 12 is received and stored in input buffer section 16 of memory 18. This input stream contains blocks that are 512 byte aligned data. Memory controller 20 will re-map the 512 byte aligned addresses to match the corresponding locations in the 516 byte aligned data in input buffer section 16 (step 100). Concurrently, memory controller 20 computes a check value for each data block, using the received host LBA (step 102).

Subsystem controller 22 now causes back end I/O processor 30 to write 516 byte aligned extended data blocks to disk drives 28 by reading the 516 byte aligned extended data blocks (step 104).

During a subsequent read action, front end I/O processor 14 receives a read command from host processor 12 which includes the host LBA (step 106). System controller 22 tells back end I/O processor 30 to retrieve the requested extended data block(s), using an address translation table and/or firmware-based calculation method, as the case may be (step 108). In response, back end I/O processor 30 retrieves the requested extended data block(s) and stores the data in output buffer section 34 of memory 18 (step 110).

Subsystem controller 22 then commands front end processor 14 to return the requested data to host processor 12. In addition, memory controller 20 reads the host LBA from host LBA table 25 (step 110). Front end processor 14 then reads the data in a 512 byte aligned fashion (step 112). In response the read request from front end I/O processor 14, memory controller 20, using data validation module 24, transfers the data while it calculates the seed host LBA from the accessed check value and compares the seed host LBA with the host LBA that was stored in LBA table 25 (step 114). If the host LBAs are coincident, front end I/O processor 14 is allowed to dispatch to host processor 12 the 512 byte aligned data from output buffer section 34 (steps 116 and 118). Otherwise, if the host LBAs are not concurrent, an error message is signaled (step 120).

In a practical implementation of the invention, subsystem controller 22 does not have sufficient physical address space to access the complete size of the input and output buffers that are used by both front end I/O processor 14 and back end I/O processor 30. Accordingly, subsystem controller 22 makes accesses to LBA table 25. LBA table 25 is thus placed such that subsystem controller 22 can access the information. It is also a practical implementation issue that the LBA, check value and the 512 byte aligned data be stored in one extended data block. That enables the LBA and check value to be stored to disk as part of a 520 byte extended data block.

In the event that LBA table 25 is stored as part of extended data blocks, dual "views" of the data are provided to the data stored and read from memory 18. More specifically, one directory table includes addresses that are indexed to the 512 byte host data blocks and another directory table that includes addresses that are indexed to the 520 byte extended data blocks. Yet one more table is caused to store the LBA and check values in a contiguous fashion. That table is placed in lower portions of the overall memory map, such that subsystem controller 22 can access the table. Accordingly, the host data blocks, check values and host LBAs can be stored in contiguous memory and accessed in accord with the directory addresses on either a 512 or 520 byte basis.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A memory subsystem for receiving a stream of data from the host processor, said stream including associated host logical block addresses (LBAs), said memory subsystem comprising:

first means for associating a check value with each received block of data, each said check value dependent upon a host LBA that is associated with a respectively received block of data;

second means for storing as extended blocks, at least each said received block of data and an associated check value; and third means responsive to a read request from said host processor, accompanied by a host LBA, for retrieving from said second means, an extended block, and for determining a correspondence or lack of correspondence of retrieved data in said extended block to data designated by said host LBA, through use of said check value retrieved as part of said extended data block.

2. The memory subsystem as recited in claim 1, wherein said third means causes transmission of said block of data to said host processor only if said check value retrieved from said extended block indicates that data in said extended block correspond to data in a data block denoted by said host LBA.

3. The memory subsystem as recited in claim 1, wherein said second means stores in each extended data block both a check value and said host LBA.

4. The memory subsystem as recited in claim 3, wherein said third means employs said host LBA received from said host processor to calculate a check value and compares said check value with said check value recovered from an extended block to determine said correspondence.

5. The memory subsystem as recited in claim 1, wherein each said received block of data is received in a first block size format, said second means stores each said received block of data and associated check value as extended blocks in a second block size format, and said third means accesses stored extended blocks based upon said second block size format.

6. The memory subsystem as recited in claim 1, wherein said first means calculates a check value for a received block of data based upon use of a host LBA as a seed value.

7. The memory subsystem as recited in claim 6, wherein said third means calculates from said check value, a host LBA value and determines if said host LBA value that is calculated is coincident with a host LBA received from said host processor.

8. A method for controlling a memory subsystem that receives a stream of data from a host processor, said stream including associated host logical block addresses (LBAs), said method comprising the steps of:

a) associating a check value with each received block of data, each said check value dependent upon a host LBA that is associated with a respectively received block of data;

b) storing as extended blocks, at least each said received block of data and an associated check value; and c) responding to a read request from said host processor, accompanied by a host LBA, by retrieving an extended block, and determining a correspondence or lack of correspondence of a block of retrieved data in said extended block, to data designated by said host LBA, through use of said check value retrieved as part of said extended data block.

9. The method as recited in claim 8, wherein step c) transmits said block of retrieved data to said host processor only if said check value retrieved from said extended block indicates that said block of retrieved data correspond to data in a data block denoted by said host LBA.

10. The method as recited in claim 8, wherein said step b) stores in each extended data block, both a check value and said host LBA.

11. The method as recited in claim 8, wherein step c) employs said host LBA received from said host processor to calculate a check value and compares said check value with said check value recovered from an extended block to determine said correspondence.

12. The method as recited in claim 8, wherein each said received block of data is received in a first block size format, said step b) stores each said received block of data and associated check value as extended blocks in a second block size format, and step c) accesses stored extended blocks based upon said second block size format.

13. The method as recited in claim 8, wherein step a) calculates a check value for a received block of data based upon use of a host LBA as a seed value.

14. The method as recited in claim 13, wherein step c) calculates from said check value, a host LBA value and determines if said host LBA value that is calculated is coincident with a host LBA received from said host processor.

* * * * *